United States Patent [19]

Kuphal et al.

[11] Patent Number: 4,946,884

[45] Date of Patent: Aug. 7, 1990

[54] BLENDS OF POLY(PROPYLENE CARBONATE) AND POLY(METHYL METHACRYLATE) AND THEIR USE IN DECOMPOSITION MOLDING

[75] Inventors: Jeffrey A. Kuphal, Blandon; Lloyd M. Robeson, Macungie; James J. Weber, Allentown, all of Pa.

[73] Assignee: Air Products and Chemicals, Inc., Allentown, Pa.

[21] Appl. No.: 365,277

[22] Filed: Jun. 12, 1989

Related U.S. Application Data

[62] Division of Ser. No. 326,938, Mar. 22, 1989, Pat. No. 4,874,030.

[51] Int. Cl.$^5$ .......................... C08K 3/10; C08L 77/02
[52] U.S. Cl. .................................... 524/403; 524/404; 524/406; 524/407; 524/408; 524/413; 524/424; 524/428; 524/430; 524/431; 524/433; 524/439; 524/440; 524/441; 525/185; 521/134; 521/138
[58] Field of Search ................ 525/185; 524/403, 404, 524/406, 407, 408, 413, 424, 428, 430, 431, 433, 439, 440, 441

[56] References Cited

U.S. PATENT DOCUMENTS

| Re. 28,723 | 2/1976 | Holder et al. ................ 525/185 |
| 3,351,123 | 11/1967 | Payne ................ 164/34 |
| 3,585,168 | 6/1971 | Inoue et al. ................ 260/77.50 |
| 3,742,088 | 6/1973 | Holder et al. ................ 525/185 |
| 3,801,673 | 4/1974 | O'Connell ................ 525/185 |
| 3,942,583 | 3/1976 | Baur . | |
| 3,953,383 | 4/1976 | Inoue et al. ................ 260/2 BP |
| 4,045,514 | 8/1977 | Iwabashi et al. ................ 525/185 |
| 4,633,929 | 1/1987 | Santangela ................ 164/34 |
| 4,698,390 | 10/1987 | Robison et al. ................ 525/133 |

FOREIGN PATENT DOCUMENTS

62-21753 3/1987 Japan .

OTHER PUBLICATIONS

T. Morse, "Handbook of Organic Additions for use in Ceramic Body Formulations", Montana Energy and MHD Research and Development Institute, Butte, Montana (1979).
S. Inoue, Organic and Bio-Organic Chemistry of Carbon Dioxide, "Synthesis of Macromolecules from Carbon Dioxide", Chapter 4, John Wiley & Sons, New York, (1982).
F. Rodriguez, "Principles of Polymer & Systems", pp. 407-411, McGraw-Hill Book Company, New York, 1970.

*Primary Examiner*—Morton Foelak
*Attorney, Agent, or Firm*—Mark L. Rodgers; William F. Marsh; James C. Simmons

[57] ABSTRACT

Compositions useful in decomposition molding procedures such as destructive foam casting or ceramic or metallic powder sintering are provided by blends of polymers having greater than 50 weight percent propylene carbonate units and polymers having greater than 50 weight percent methyl methacrylate units. Such blends exhibit an unexpectedly even decomposition profile over the range of temperatures at which their constituent polymers each decompose relatively rapidly. The controlled decomposition rate reduces problems in destructive foam casting and ceramic or metallic powder molding caused by sudden release of gases by the foam pattern or the polymer binder. Preferred blends contain 35 to 65 weight percent poly(methyl methacrylate) and 65 to 35 weight percent poly(propylene carbonate), and very even decomposition behavior is exhibited by blends of 35 to 45 weight percent poly(methyl methacrylate) and 65 to 55 weight percent poly(propylene carbonate).

8 Claims, 1 Drawing Sheet

THERMOGRAVIMETRIC ANALYSIS OF PPC/PMMA BLENDS

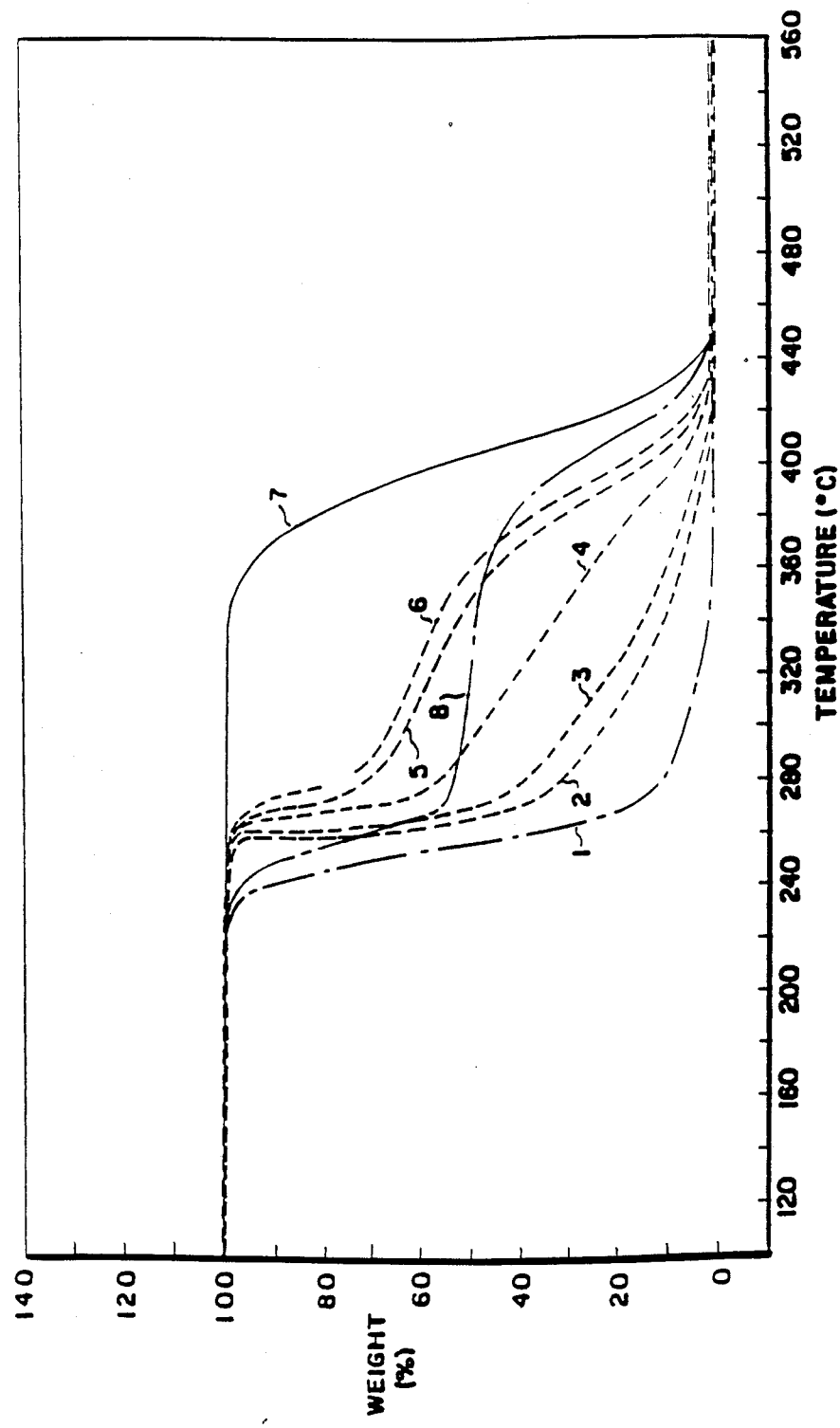

BLENDS OF POLY(PROPYLENE CARBONATE) AND POLY(METHYL METHACRYLATE) AND THEIR USE IN DECOMPOSITION MOLDING

TECHNICAL FIELD

This invention relates to blends of polymers having propylene carbonate units and polymers of methyl methacrylate. In another aspect it relates to a method of destructive foam casting, wherein the foam is made from a blend of a propylene carbonate-containing polymer and a polymer of methyl methacrylate. In still another aspect, it relates to a method of molding ceramic or metallic powder in which a blend of the propylene carbonate polymer and the methyl methacrylate polymer is used as a binder for the powder and decomposed during an initial firing stage.

BACKGROUND OF THE INVENTION

Polymeric materials which decompose cleanly have proven to be very valuable in molding processes such as destructive foam casting, sometimes referred to as lost plastic pattern casting, and sintering of ceramic or metallic powders. For example, U.S. Pat. No. 3,351,123 discloses an evaporative pattern casting process using a mold of foamed thermoplastic resin with a refractory coating. Synthetic resins disclosed as useful in this process include polymers of cellulose ethers and esters, olefins, vinyl esters of carboxylic acids, vinyl ethers, methacrylic acid esters of alcohols containing up to 18 carbon atoms, vinyl aromatic compounds, unsaturated carboxylic acids, and the like. In general, polymers of monomeric materials containing a vinylidene group are useful. From the group of resins disclosed by this patent, only two have been attractive commercially, these being polystyrene and poly(methyl methacrylate). Polystyrene, however, does not decompose cleanly, which is typical for polymers containing aromatic structural units. On decomposing, these polymers yield a carbonaceous residue which reduces the quality of the metal casting and is unacceptable where high quality castings are required. Poly(methyl methacrylate) decomposes without carbonaceous residue. This polymer, however, releases large quantities of gas upon exposure to the molten metal and presents a problem in the build-up of unacceptable pressure which results in casting flaws.

U.S. Pat. No. 3,942,583, Baur, (1976) also discloses using lost plastic patterns for metal casting molds built up from plastic plate or sheet material bonded to an internal support frame. The plastic plate or sheet materials can be made from foamed plastics, such as foams of polyurethane, phenolic resin, polystyrene, cellulose acetate, polyvinyl chloride, polyethylene or poly(vinyl acetate).

U.S. Pat. No. 4,633,929, Santangelo, et al., (1987) discloses that poly(alkylene carbonates) formed from carbon dioxide and oxirane compounds can be used for evaporative pattern casting and on decomposition yield no carbonaceous deposit in contrast to polystyrene. Poly(propylene carbonate) and other poly(alkylene carbonates) having molecular weights in the range of 5,000 to 2,000,000 and higher can be foamed with blowing agents and used in such casting operations.

Decomposable polymers are also valuable in service as binders for either ceramic or metallic powders which are then shaped and fused by sintering at high temperatures. A description of the utility of the polymeric binders for making parts of ceramic powders is described in T. Morse, "Handbook of Organic Additives for Use in Ceramic Body Formulation", Montana Energy and MHD Research and Development Institute, Butte, Mont., (1979). In addition to binders, other additives are used to serve as lubricants, dispersants or antifoams. The binder/lubricant system is baked out of the ceramic shape during the bisque firing step. Binders having a rapid burn-off require a long, slow bisque firing. Binders disclosed include poly(vinyl alcohol), acrylic resins, poly(vinyl butyral) and waxes.

U.S. Pat. No. 3,585,168 (1971) and U.S. Pat. No. 3,953,383 (1976) to Inoue, et al., describe the preparation of poly(propylene carbonate) by the copolymerization of propylene oxide and carbon dioxide. A detailed discussion concerning the preparation of poly(propylene carbonates) as well as other poly(alkylene carbonates) is given by Inoue, Higashi and Yamazaki, "Synthesis of Macromolecules from Carbon Dioxide". *Organic and Bio-Organic Chemistry of Carbon Dioxide,* Chapter 4, John Wiley & Sons, New York (1982).

F. Rodriquez, *Principles of Polymer Systems,* pages 407–411 McGraw-Hill Book Company, N.Y. (1970), describes the polymerization of methyl methacrylate, a well known monomer which has been used commercially to form polymers for several decades.

U.S. Pat. No. 4,698,390, Robeson, et al., (1987) describes a compatible blend of a vinyl chloride derived polymer and a polycarbonate having repeating units derived from bis-(3,5-dimethyl,4-hydroxyphenyl) sulfone. The vinyl chloride polymer can be a copolymer of at least 50 wt. % vinyl chloride and methyl methacrylate. The polycarbonates disclosed are quite different from poly(propylene carbonate) and do not suggest blends of such polymers with poly(methyl methacrylate).

Japanese Patent Application SHO No. 62/21753, Inoue, et al. (1987) discloses using poly(alkylene carbonate). preferably poly(ethylene carbonate) and poly(propylene carbonate), as a binder for molding ceramic or metallic powders. Additives such as plasticizers, lubricants and other binders, can be used as long as the purpose is not adversely affected. Other binders listed are polyethylene, polypropylene, polybutene, poly(methyl methacrylate), polystyrene, ethylene-vinyl acetate copolymer, as well as their low molecular weight compounds, natural waxes and the like. There is no recognition of any benefit in combining poly(propylene carbonate) and poly(methyl methacrylate) specifically in any proportions for use as a binder nor is there any suggestion of use in evaporative foam casting.

SUMMARY OF THE INVENTION

We have discovered that improved compositions useful in both evaporative foam casting, and as binders for ceramic or metallic powders, where decomposition of the polymer is required in the molding procedure, are provided by a blend of a polymer having greater than 50 wt. % propylene carbonate units and another polymer having greater than 50 wt. % methyl methacrylate units. The blend of these polymers has been found to exhibit good mechanical compatibility and demonstrate an unexpected decomposition behavior. Unlike the constituent polymers of poly(propylene carbonate) and poly(methyl methacrylate) which decompose within a narrow temperature range, the blend of this invention decomposes over a broad temperature range. At the onset of decomposition, unlike either poly(propylene carbonate) or poly(methyl methacrylate), which exhibit a sharp loss in weight shortly after the beginning of the decomposition, the blend exhibits a gradual loss in weight over a much broader temperature range. This behavior is important in order to prevent a buildup of pressure in the process when using the polymer as either a pattern material or as a binder. The volatile decomposition products which are gases can be removed from the molding area at a slow rate greatly simplifying the control of the processing steps required for both evaporative foam casting and ceramic or metallic powder sintering. As a further advantage, the resistance of the polymer blend to creep at room temperature or slightly above (e.g. up to about 70° C.), is better than the creep resistance of poly(propylene carbonate). The polymer blend decomposes cleanly and leaves no contaminating residues.

According to our invention, therefore, a process is provided for pattern casting which comprises forming a pattern from a foamed blend of a polymer of propylene carbonate units and a polymer of methyl methacrylate within a shell, pouring molten metal into the shell in contact with the foamed blend and thereby decomposing the polymers of the blend, and permitting the gaseous decomposition products from the polymers to escape from the shell during the pouring step. Another molding method is provided wherein ceramic or metallic powder is mixed with a blend of the polymer of propylene carbonate units and the polymer of methyl methacrylate, the mixture is pressed into a desired shape which is then heated in a first firing step to decompose the polymers to gaseous products, these gases being permitted to escape before the shape is then heated to its final firing temperature.

BRIEF DESCRIPTION OF THE DRAWING

FIG. 1 is a graph showing the decomposition profiles of various blends of this invention and of the constituent polymers.

DETAILED DESCRIPTION OF THE INVENTION

There is a substantial demand for polymers which decompose cleanly in molding processes such as evaporative foam casting, and ceramic or metallic powder sintering. Key performance characteristics of such polymers are low creep and controlled degradation, so that high gas volumes are not produced suddenly during the molding process. Although both poly(propylene carbonate) and poly(methyl methacrylate) decompose cleanly, the poly(propylene carbonate) exhibits unacceptable creep resistance and poly(methyl methacrylate) releases high gas volumes upon reaching its initial decomposition temperature. According to this invention, improved compositions are provided with a blend of the poly(propylene carbonate) and poly(methyl methacrylate), the blend exhibiting good mechanical compatibility and possessing an unexpected decomposition profile. Thermogravimetric analysis of the weight loss profile of this blend shows that the decomposition and weight loss occurs over a relatively broad temperature range. This behavior is very desirable in decomposition molding and is quite unexpected. The blends, therefore, can be used to advantage in evaporative foam casting, as binders for ceramic or metallic powders, in investment casting and similar applications requiring clean decomposition of the polymeric materials.

Evaporative foam casting is a process in which a pattern is made from a foamed organic polymer which is then surrounded by inorganic particles, such as sand or a ceramic shell. The foam pattern is then replaced by pouring in a molten metal such as iron, steel, aluminum, ferrous alloys and the like. As the metal is poured into the foam, the foam collapses as the temperature rises above the $T_g$ or $T_m$ of the polymer. As the temperature increases further the polymer decomposes into gaseous products which escape through the porous sand or ceramic shell. The molten metal replaces the foam pattern and solidifies yielding the desired shape.

Organic polymers are also used as binders for ceramic or metallic powders in molding which allow the powders to be pressed and held in a desired shape until the ceramic or metallic material can be sintered at high temperatures. It is desired that the binder cleanly decompose at an intermediate stage, commonly referred to as the bisque firing stage, prior to the final firing which is conducted at much higher temperatures. In addition to having clean decomposition characteristics, it is desired that such a binder decompose over a broad temperature range unless low volatility compounds result from decomposition in a narrow temperature range. Poly(methyl methacrylate) decomposes in a narrow temperature range with release of highly volatile compounds, whereas poly(propylene carbonate) yields low volatility compounds over its decomposition range, which is, nevertheless, quite narrow. The release of volatile compounds over a narrow temperature range results in a rapid internal buildup of pressure in the ceramic or metallic powder shape during the bisque firing stage, unless a very slow heating procedure is used. Attempting to slow the increase in temperature is undesirable as this adversely affects productivity and energy costs.

In connection with the present invention, it is shown that poly(propylene carbonate) exhibits marginal to unacceptable creep resistance., e.g. in lost foam applications, due to its low glass transition temperature. One solution to this problem would be to utilize poly(alkylene carbonates) with high glass temperatures. While this route is indeed possible, the availability of low cost monomers or acceptable polymerization routes to these materials are not as favorable as for poly(propylene carbonate). It has been found that poly(methyl methacrylate) can be added to poly(propylene carbonate) to yield improved creep resistance and a property balance indicating good mechanical compatibility. Even if some creep resistance improvement were to be expected, the mechanical compatibility is quite unexpected as these polymers are structurally very different. The most unexpected behavior, however, occurs with the degradation characteristics.

Poly(propylene carbonate) and poly(methyl methacrylate) are phase separated in blends and thus the degradation characteristics (as determined using thermogravimetric analysis) would be expected to be a composite of the weighted average values for the unblended polymers. Surprisingly, this is not the case. The data for the blends markedly deviates from the expected results based on a composite curve of the weighted average results. Both poly(propylene carbonate) and poly(methyl methacrylate) exhibit a sharp loss in weight soon after the onset of decomposition. The blend exhibits a slower and more gradual weight loss over a much broader temperature range. This behavior is important in preventing pressure build-up in the process utilizing the polymer as a pattern material or as a binder (e.g. for ceramic or metallic powders). The decomposition behavior of these blends enables a slower rate of removing volatile compounds from the mold. This is important in both evaporative foam casting and ceramic and metallic powder moldings.

The polymer containing propylene carbonate units should have a molecular weight of at least 5,000 to assure desired mechanical properties and a molecular weight of about 3,000,000 is a useful upper limit. Above this molecular weight the viscosity would be too high to be useful for most of the intended molding applications. Preferably, this polymer of propylene carbonate contains at least 70 weight percent propylene carbonate units and less than 200 ppm of metallic residue.

While poly(propylene carbonate) is preferred, the polymer can also be a copolymer containing greater than 50 weight percent propylene carbonate units, such as a copolymer containing propylene carbonate and propylene oxide units. Also, copolymers could include propylene carbonate with ethylene carbonate or other carbonates of cyclic or acyclic alkylenes having 2 to 6 carbon atoms, such as isobutylene carbonate, cyclohexene carbonate, cyclopentene carbonate, and the like. Such copolymers can be formed by copolymerizing carbon dioxide with propylene oxide and other oxirane compounds having the formulas:

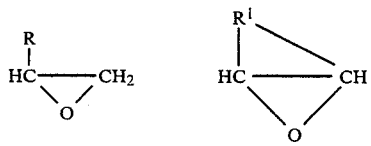

wherein R is an alkyl or cycloalkyl group containing 1-6 carbon atoms and R' is an alkylene group containing 2 to 8 carbon atoms. These homopolymers and copolymers of propylene carbonate can be prepared by the carbon dioxide-oxirane copolymerizations described by the Inoue, et al. references cited above. A recent patent by H. S. Sun. U.S. Pat. No. 4,783,445, teaches a process for preparing soluble zinc catalysts useful for the preparation of $CO_2$ and oxirane copolymers.

The polymer of methyl methacrylate can be prepared by any conventional technique, although free radical polymerization is generally preferred. Such methods employing free radical polymerization include bulk polymerization, suspension polymerization, solution polymerization and emulsion polymerization. Both the homopolymers and copolymers of methyl methacrylate can be made by these procedures and suitable comonomers include acrylates, such as ethyl methacrylate, ethyl acrylate, butyl acrylate, butyl methacrylate, methyl acrylate, or the like; nitriles such as acrylonitrile, and other monomers having 5 to 8 carbon atoms, such as isobutylene, styrene, vinyl acetate, maleic anhydride, and the like. Copolymers should contain greater than 50 weight percent, preferably at least 75 weight percent methyl methacrylate.

The poly(propylene carbonate), PPC, and poly(methyl methacrylate), PMMA, including the described copolymers, can be blended over a broad range of 10 to 90 weight percent of each polymer. Blends containing 35 to 65 weight percent poly(methyl methacrylate) and 65 to 35 weight percent poly(propylene carbonate) are preferred for dimensional stability during heating a few degrees above ambient temperature and for their demonstrated gradual decomposition behavior. Blends of 35 to 55 percent PMMA and 65 to 45 percent PPC are particularly outstanding in even decomposition characteristics over 260 to 440° C.

The polymers can be blended by various methods including blending in a solution in a common solvent followed by devolatilization, or by milling the solid polymers, suitably originally in pellet form, including extrusion of the polymers from a mixture of pellets. This technique is preferred for evaporative foam casting where pellets can be prepared containing blowing agents, such as pentane, fluorocarbon, or other volatile blowing agents, and the blowing agent can be incorporated during extrusion or by exposure of the extruded pellets to the operative blowing agent. In using the blend as a binder for ceramic or metallic powders, a blend solution in a common organic solvent can be mixed with the ceramic or metallic powder, followed by vaporizing the solvent. A preferred method would include making a melt blend of the ceramic or metallic powder with either the unblended polymer components, or a preblended mixture of the polymer components. Also, water-based systems can be used in which an emulsion of poly(propylene carbonate) and poly(methyl methacrylate) is formed and used as the binder. The blend could also be prepared by polymerizing methyl methacrylate in the presence of poly(propylene carbonate).

The amount of binder used depends upon the nature of the ceramic or metallic powder and its particle size, the use of lubricants or other additives and the molding application, but can range from as low as 0.1 wt. % based on the ceramic or metallic powder to as high as 60 wt. %. Amounts in the range of 0.5 to about 30 wt. %, and especially 0.5 to about 15 wt. %, are preferred.

Ceramic or metallic powders employed can be chosen from a number of materials including:

(1) Metal powders
Aluminum, copper, iron, manganese, tungsten, molybdenum, titanium, zirconium, vanadium, nickel, cobalt, silver, gold, zinc, tin, lead, antimony, bismuth, platinum, silicon, tantalum, chromium, stainless steel, and combinations of the above metals.

(2) Metallic oxides
Oxides of the metals listed above plus calcium oxide, beryllium oxide, magnesium oxide, barium oxide, lanthanum oxide, indium oxide, oxides having plural metal elements, e.g. perovskite structures such as $BaTiO_3$ and $SrZrO_3$ and oxides of structures including $ZnAl_2O_4$, $CoAl_2O_4$, $MgAl_2O_4$, $FeCrO_4$, $MNTiO_3$, $FeTiO_3$ and including lead zirconium titanates, yttrium barium copper oxides, lanthanum barium copper oxides and the like.

(3) Metallic nitrides
Silicon nitride, boron nitride, aluminum nitride, titanium nitride, zirconium nitride and the like.

(4) Metallic Carbides
Silicon carbide, titanium carbide, zirconium carbide, boron carbide, chromium carbide, tungsten carbide and the like.

(5) Metallic borides
Titanium boride, zirconium boride and the like.

EXAMPLES

The following examples serve to give specific illustrations of the practice of the invention but are not intended in anyway to limit the scope of this invention.

Control A

Pellets of poly(propylene carbonate) (prepared by copolymerizing propylene oxide and carbon dioxide and having a melt flow of 1.06 dg/min. at 160° C./44 psi) were compression molded at 140° C. in a 0.02×4×4 inch cavity mold. The molding was performed in a Greenerd hydraulic press with heated platens. The molded plaque was obtained by pressing molten polymer between cavity mold halves at 30 tons of pressure, after which, cooling water was channeled through the platens to return the unit to room temperature. The molded plaque was shear cut into ⅛ inch wide strips. These strips were tested for tensile modulus according to a procedure similar to ASTM D-638, tensile strength and elongation at break according to ASTM D-638. The results are listed in Table I.

Control B

Poly(methyl methacrylate) powder (obtained from Scientific Polymer Products, Cat. No. 037B) was compression molded at 200° C. in a 0.02×4×4 inch mold by the procedure described for Control A. Mechanical properties were determined by the procedure described for Control A. The results are shown in Table I.

EXAMPLES 1-4

Various parts by weight of Control A and Control B were melt blended in a Brabender Plasticorder at 160° C. The mixtures were molded into a 0.02×4×4 inch plaque at 180° C. by the procedure described for Control A. Mechanical properties were determined by the procedure described for Control A. The results are shown in Table I with the parts by weight of each control making up the blend given for each Example.

room temperature to 500° C. under nitrogen. The decomposition profile showing weight percent of the sample remaining at various temperatures is displayed in FIG. I as curve No. 1.

Control D

Pellets of poly(methyl methacrylate) were compression molded into a 0.02×4×4 inch cavity mold by the procedure described for Control A. Control D was an impact modified grade polymer available from Rohm & Haas under the tradename of Plexiglas DR-100.

Mechanical properties were determined by the procedure described for Control A. The results are shown in Table II. A piece of the plaque weighing about 10 milligrams was placed in a DuPont Model 1090 Thermal Analyzer and heated at 10° C./min from room temperature to 500° C. under nitrogen. The decomposition profile showing weight percent of the sample remaining at various temperatures is displayed in FIG. 1 as Curve No. 7.

EXAMPLES 5-9

Various parts by weight of Control C and Control D were melt blended in a Killion extruder (1 inch diameter, L/D=30:1) utilizing a temperature profile of 180° C. The resultant product was injection molded into ASTM test bars using a 1.7 ounce Newbury Industries, reciprocating screw injection molding machine. The parameters used in injection molding the blends were 190° C. at the nozzle, front zone and middle zone and 175° C. at the rear zone; overall cycle time was 60 seconds, overall injection time was 35 seconds and initial injection time was 23 seconds. Initial injection pressure was 1200 psi, secondary injection pressure was 600 psi, screw speed was 100 rpm, and mold temperature was

TABLE I

Mechanical Properties of Compression Molded Blends of Control A and Control B

| Example | Polymer | Wt % | Tensile Modulus (psi) | Yield Strength (psi) | Tensile Strength @ Break (psi) | % Elongation @ Break |
| --- | --- | --- | --- | --- | --- | --- |
| Control A | Poly (propylene carbonate) | 100 | 148,000 | 2,500 | 1,300 | 110 |
| Example 1 | Control A | 90 | 352,000 | 6,500 | 5,900 | 4 |
|  | Control B | 10 |  |  |  |  |
| Example 2 | Control A | 75 | 348,000 | — | 6,500 | 3 |
|  | Control B | 25 |  |  |  |  |
| Example 3 | Control A | 50 | 295,000 | — | 6,700 | 4 |
|  | Control B | 50 |  |  |  |  |
| Example 4 | Control A | 25 | 325,000 | — | 7,000 | .5 |
|  | Control B | 75 |  |  |  |  |
| Control B | Poly (methyl methacrylate) | 100 | 306,000 | — | 10,700 | 8 |

Control C

Pellets of poly(propylene carbonate) (prepared by copolymerizing propylene oxide and carbon dioxide and having a melt flow of 0.48 dg/min at 160° C./44 psi) were compression molded at 140° C. in a 0.02×4×4 inch cavity mold by the procedure described for Control A. Mechanical properties were determined by the procedure described for Control A. The results are shown in Table II. A piece of the plaque weighing about 10 milligrams was placed in a DuPont Model 1090 Thermal Analyzer and heated at 10° C./min from 20° C. The injection molded specimens were compression molded into a 0.02×4×4 inch plaque at 180° C. by the procedure described for Control A. Mechanical properties were determined by the procedure described for Control A. The results are shown in Table II with the parts by weight of each control making up the blend given for each Example. A piece of the plaque for each specimen was tested for thermal decomposition as described for Controls C and D. The decomposition profile showing weight percent of the sample remaining at various temperatures is displayed in FIG. 1 as curves Nos. 2-6 for Examples 5-9, respectively.

TABLE II

Mechanical Properties of Compression Molded Blends of Control C and Control D

| Example | Polymer | Wt % | Tensile Modulus (psi) | Yield Strength (psi) | Tensile Strength @ Break (psi) | % Elongation @ Break |
|---|---|---|---|---|---|---|
| Control C | Poly (propylene carbonate) | 100 | 269,000 | 7,200 | 5,500 | 16 |
| Example 5 | Control C | 90 | 251,000 | 5,700 | 4,900 | 12 |
|  | Control D | 10 |  |  |  |  |
| Example 6 | Control C | 75 | 239,000 | 6,300 | 5,700 | 6 |
|  | Control D | 25 |  |  |  |  |
| Example 7 | Control C | 60 | 242,000 | 6,600 | 6,300 | 6 |
|  | Control D | 40 |  |  |  |  |
| Example 8 | Control C | 50 | 218,000 | — | 6,600 | 6 |
|  | Control D | 50 |  |  |  |  |
| Example 9 | Control C | 40 | 221,000 | — | 5,800 | 6 |
|  | Control D | 60 |  |  |  |  |
| Control D | Poly (methyl methacrylate) | 100 | 175,000 | 7,300 | 6,900 | 36 |

EXAMPLE 10

Injection molded specimens of Control C, Control D and Examples 5, 6, 7, 8, 9 were conditioned at room temperature for 1 week. Alloys with less than 40% Control D experienced noticeable stress relaxation resulting in dimensional instability.

EXAMPLE 11

Injection molded specimens of Control C, Control D and Examples 5, 6, 7, 8, 9 were placed in an air circulating oven at 70° C. supported at both ends in a no load situation. After one hour, blends with less than 40% Control D collapsed under their own weight. Specimens with greater than 40% Control D became flexible but retained their original dimensions.

The results shown by the above examples demonstrate good mechanical compatibility for the blends with an unexpected gradual weight loss with temperature increase. These results combined with the stress relaxation results indicate these blends offer characteristics desired for applications requiring clean degradation such as evaporative foam casting, binders for ceramic and metallic powders, investment casting and the like. Blends containing at least 35 wt. % poly(methyl methacrylate) are preferred.

Referring to FIG. 1, the Thermogravimetric analyses are shown for control polymers C, poly(propylene carbonate), PPC, and D, poly(methyl methacrylate), PMMA, and the blend compositions of Examples 5-9. The curves on the graph show the relationship between weight percent of each specimen remaining and any given temperature during the heating procedure. Identification of each curve with the polymer specimens is as follows:

| Curve | Polymer Specimen |
|---|---|
| 1. | Pure PCC - Control C. |
| 2. | 90% PPC/10% PMMA, Example 5 |
| 3. | 75% PPC/25% PMMA, Example 6 |
| 4. | 60% PPC/40% PMMA, Example 7 |
| 5. | 50% PPC/50% PMMA, Example 8 |
| 6. | 40% PPC/60% PMMA, Example 9 |
| 7. | Pure PMMA Plexiglas DR-100, - Control D |

Also shown is a curve B representing the calculated decomposition behavior of a 50/50 wt. % blend of PPC and PMMA using the curve data for the constituent polymers, controls C and D. Both PPC and PMMA exhibited a sharp weight loss at the onset of decomposition followed by an equally sharp reduction in weight loss rate. These polymers decomposed over a relatively narrow temperature range. A blend of the polymers would be expected to have two periods of fast decomposition, one for PPC and later for the PMMA. This is shown not to be the case for all Examples 5-9, but especially for Examples 7-9. Example 7 was the best for slow, even decomposition over the full temperature range.

Various other embodiments and aspects of our invention will occur to those skilled in the art without departing from the spirit or scope of the invention.

We claim:

1. A composition comprising a blend of (a) polymer having greater than 50 weight percent propylene carbonate units and (b) polymer having greater than 50 weight percent methyl methacrylate units.

2. The composition of claim 1 wherein said polymer (a) contains at least 70 weight percent propylene carbonate units and said polymer (b) contains at least 75 weight percent methyl methacrylate units.

3. The composition of claim 1 comprising a blend of poly(propylene carbonate) and poly(methyl methacrylate).

4. The composition of claim 1 wherein said blend contains 10 to 90 weight percent of the propylene carbonate containing polymer and 90 to 10 weight percent of the methyl methacrylate containing polymer.

5. The composition of claim 4 wherein said blend contains 65 to 35 weight percent of the propylene carbonate containing polymer and 35 to 65 weight percent of the methyl methacrylate containing polymer.

6. The composition of claim 3 wherein said blend contains 65 to 35 weight percent poly(propylene carbonate) and 35 to 65 weight percent poly(methyl methacrylate).

7. The composition of claim 3 wherein said blend contains 55 to 65 weight percent poly(propylene carbonate) and 45 to 35 weight percent poly(methyl methacrylate).

8. A molding composition comprising a blend of polymers (a) and (b) of claim 1 and ceramic or metallic powder.

* * * * *